United States Patent [19]

Balsells

[11] Patent Number: 4,890,937

[45] Date of Patent: Jan. 2, 1990

[54] SPRING-LOADED BEARING

[75] Inventor: Peter J. Balsells, P.O. Box 15092, Santa Ana, Calif. 92705

[73] Assignees: Peter J. Balsells; Joan C. Balsells, Santa Ana, Calif.

[21] Appl. No.: 244,078

[22] Filed: Sep. 14, 1988

[51] Int. Cl.$^4$ .................. F16C 29/02; F16C 33/74
[52] U.S. Cl. ........................... 384/16; 277/163; 277/205; 384/32; 384/37; 384/215
[58] Field of Search ............... 384/10, 15, 16, 29, 384/32, 37, 38, 192, 215, 218, 219; 277/163, 205

[56] References Cited

U.S. PATENT DOCUMENTS

| | | | |
|---|---|---|---|
| 2,531,079 | 11/1950 | Payne | 286/9 |
| 2,707,135 | 4/1955 | Monahan | |
| 2,964,339 | 12/1960 | Macks | 286/10 |
| 3,047,299 | 7/1962 | Karsten | 277/27 |
| 3,266,855 | 8/1966 | Cleff | 384/218 X |
| 3,485,538 | 12/1969 | Nogle et al. | 384/215 |
| 3,592,517 | 7/1971 | Harris | 384/215 |
| 3,665,816 | 5/1972 | Caudle | 92/168 |
| 3,727,923 | 4/1973 | McEwen | 277/9 |
| 4,406,463 | 9/1983 | Fabrowsky | 277/53 |
| 4,630,636 | 12/1986 | Cutcher | 137/3.5 |
| 4,655,462 | 4/1987 | Balsells | 277/163 X |

FOREIGN PATENT DOCUMENTS

| | | | |
|---|---|---|---|
| 1305706 | 8/1962 | France | 384/215 |
| 249510 | 9/1987 | German Democratic Rep. | 384/37 |

Primary Examiner—Thomas R. Hannon
Attorney, Agent, or Firm—Walter A. Hackler

[57] ABSTRACT

A cartridge bearing assembly includes a non-resilient tubular bearing element and a spring for causing the tubular bearing element to float with a shaft therethrough within a surrounding housing. Because loading between the bearing element and the shaft is eliminated, very close tolerances can be held therebetween and wear between the bearing and the shaft therethrough is substantially reduced. Seals may be incorporated into the bearing member in applications where a pressure drop is desired across the bearing shaft interface.

14 Claims, 1 Drawing Sheet

SPRING-LOADED BEARING

The present invention generally relates to bearings for reciprocating shafts, and more particularly relates to a spring loaded bearing assembly for improving dynamic guidance between a shaft and a bore.

Power in a multitude of devices, such as, for example, pumps, is provided by reciprocating shafts. It is, of course, imperative that the shaft has the ability of reciprocate to maintain its functionality, while at the same time being able to accept loading forces without rapid deterioration of the shaft and a supporting bore through excessive wear.

Heretofore, journal bearings have been extensively used, and such bearings are generally press-fitted into a bore with the shaft moving dynamically on the inside diameter of the general bearing.

In this instance, the load is supported by the inside surface of the bearing. Because the bearing may be subjected to excessive loads caused by misalignment of the shaft therein, uneven wearing on the bearing occurs, resulting in early failure of the device. In situations where seals are used in conjunction with the bearing, uneven wear on seals may cause leakage of fluids or gases past the shaft/bearing interface.

SUMMARY OF THE INVENTION

A cartridge bearing assembly for reciprocating shafts in accordance with the present invention generally includes a non-resilient tubular bearing element having means defining an inside dynamic surface for engaging a rotatable shaft and spring means for absorbing shaft loading. The shaft loading is transmitted through the tubular bearing element with the spring means being disposed between an outside static surface of the tubular bearing element and a surrounding housing.

It should be appreciated that heretofore bearing elements for the centering of shafts with a bore and for carrying the load of the shaft have not dynamically supported the shaft within the bore. The tubular bearing element of the present invention moves with the shaft as it is dynamically floated within the bore by a spring which is preferably an annually radially resistant canted coiled spring, having a generally flat force-deflection characteristic in the deflection range defined by the difference in radius of the tubular member bearing element outside static surface and a housing inside surface.

In accordance with the present invention, the tubular bearing element is stationary with regard to the shaft reciprocal movement, but moves with the shaft in any off-axial movement, thus transmitting such loading onto the radially resilient canted coiled spring.

The cartridge bearing assembly in accordance with the present invention may also include first a seal means for providing a seal between the tubular bearing element inside dynamic surface and the shaft and second seal means for providing a seal between the tubular bearing element outside static surface and the housing inside surface.

In this manner the non-resilient tubular bearing element not only functions to carry and center the shaft within the bore, but also provides for preventing leakage of liquids or gases past the tubular bearing element/shaft interface in situations where a pressure drop is desired across the tubular bearing element/shaft interface.

The cartridge bearing assembly according to the present invention may also include conduit means passing through the tubular bearing element along a radius thereof for introducing a lubricant between the shaft and tubular bearing element inside dynamic surface and between the housing inside surface and the tubular bearing element outside static surface.

Alternatively, if the conduit means is disposed on a down pressure side of the first or second seal means it may be used to monitor fluids or gases passing the seal means in order to determine the functionality of this seal or to provide advance warning of leaking toxic substances should that be the environment in which the apparatus of the present invention is used.

There also may be provided means for preventing spring overload by off-axial movement of the shaft. In situations where the loading capability of the spring may be exceeded, it is preferable to provide means defining a groove in the tubular bearing element outside dynamic surface having adjacent portions for limiting the compression of the spring to the depth of the groove.

BRIEF DESCRIPTION OF THE DRAWINGS

A better understanding of the present invention may be had from the consideration of the following detailed description, taken in conjunction with the accompanying drawings, in which.

DETAILED DESCRIPTION

Figure 1:
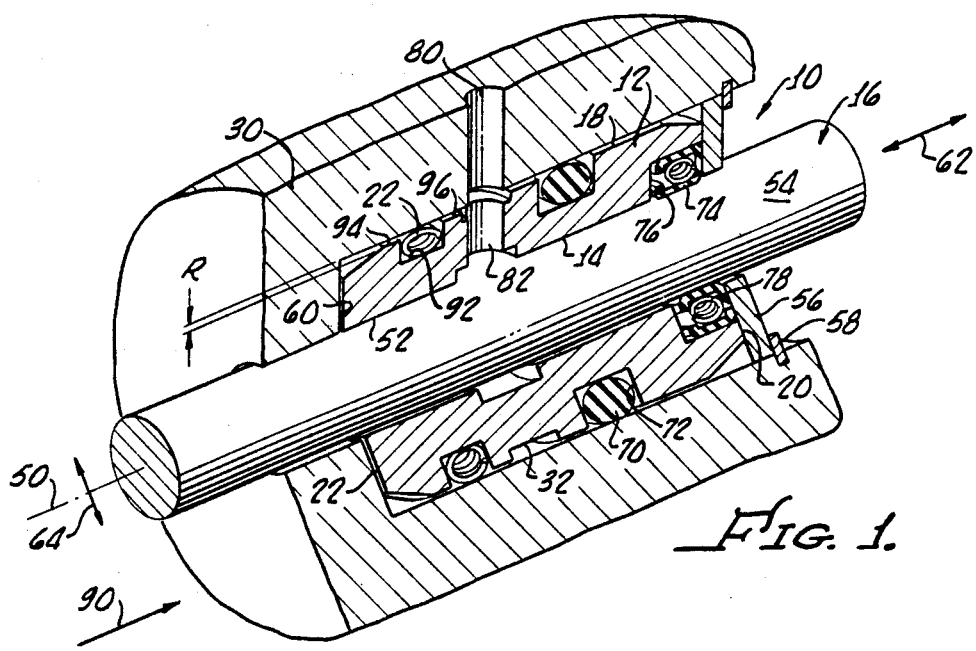
FIG. 1 is a broken away perspective view of a cartridge bearing assembly in accordance with the present invention generally showing a non-resilient tubular bearing element, with spring means for floating a shaft within a housing, and also showing seals for preventing leakage between the shaft and the bearing element and the housing.

Turning now to FIG. 1, there is shown a cartridge bearing assembly 10 in accordance with the present invention, generally including a non-resilient tubular bearing element 12, having an inside dynamic surface 14 for engaging a reciprocating shaft 16 and an outside static surface 18.

The bearing element 12 may be formed from any suitable material, such as plastic, for use in environments where the pressure drop across the bearing element 12 from one end 20 to another end 21 is up to 10,000 psi. At 10,000 psi pressure drop and greater pressures, the bearing element may be formed from stainless steel, or the like. A spring 22 provides means for engaging the outside static surface 18 of the tubular bearing element 12, causing the tubular bearing element 12 and shaft 16 to float within a surrounding housing 30.

An important feature of the present invention is the use of an annular canted coiled spring 22 having a generally flat radial force-deflection characteristic in the deflection range R defined by the difference in the radius of the tubular bearing element outside static surface 18 and a housing inside surface 32. Such springs are described in U.S. Pat. No. 4,655,462, issued on Apr. 7, 1987, which is hereby expressly incorporated in its entirety into the present application. Co-pending Pat.

Application Ser. Nos. 208,455, 232,430, filed June 20, 1988 and Aug. 15, 1988, respectively, also describe radially loaded springs.

Figure 2:
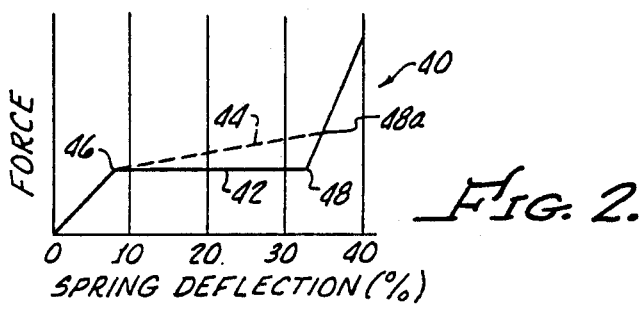
FIG. 2 is a force-deflection curve of a spring suitable for use in the present invention.

Turning to FIG. 2, the spring 22 suitable for the present invention, generally has a load deflection curve 40 which has a generally flat portion 42, or a low rising linear portion 44, between a minimum load point 46 and a maximum load point 48 or 48a.

Hence, in the operating range of the spring between 46 and 48 or 48a, the force exerted by the spring 22 remains generally constant, despite the spring deflection. Thus, wearing of the bearing 12 at its inside surface 14 or irregularities in the shaft 16 do not affect the force exerted on the bearing 12 by the spring 22 in order to ensure proper uniform force exerted around the periphery of the bearing 12, to enable its dynamic suspension, or floating, of the bearing 12 along with shaft therein within the housing 30.

Because the bearing 12 floats or moves with the shaft in any off-axial of movement, that is, movement transverse to the shaft centerline 50, any off-axial load (sideload) is absorbed by the spring 22. Hence, there is no axial loading or transverse loading across the bearing/shaft interface 52 as defined by the inside dynamic surface 14 and a shaft surface 54. A stop 56 and a keeper 58 may be provided to hold the bearing 12 within the housing 30 and against a front wall 60 of the housing to prevent movement of the bearing 12 during reciprocal movement shown by the arrows 62, but not limit the off-axial movement of the shaft 16 and bearing member 12 as shown by the arrow 64.

Hence, it should be readily appreciated that because the shaft and bearing 12 move together, excess loading therebetween due to off-axial movement of the reciprocating shaft 16, is non-existent. All such sideloading is absorbed by the spring 22.

It should be appreciated that spring sizing is dependent upon many factors including, but not limited to, the size and weight of the shaft as well as the size and weight of the bearing and the anticipated pressure drop across the bearing 12.

Turning again to FIG. 1, for low pressure environments a simple O-ring 70 may be disposed in a groove 72 in the bearing member 12 in order to provide a seal between the tubular bearing element outside static surface 18 and the housing inside surface 32. In addition, a U-shaped elastomer member 74 fitted into a second groove 76 and enclosing a spring 78 provides a seal between the tubular bearing element inside surface 14 and the shaft surface 54. The O-ring and the U-shaped member 74 may be formed from any suitable elastic sealing material and sized and formed to provide sealing against anticipated pressures.

If it is desired to introduce a lubricant between the shaft 16 and the tubular bearing element inside dynamic surface 14 and between the housing inside surface 32 and the tubular member outside static surface 18, interconnected conduits 80, 82 through the housing 30 and through the bearing element 12 may be provided. The conduits 80, 82 enable a lubricant to be introduced between the hereinabove described surfaces by flowing lubricant thereinto and allowing pressure along the direction of the arrow 90 to force the lubricant between the hereinabove identified surfaces.

A groove 92 in the bearing 12 along with adjacent shoulders 94 and 96, provide means for preventing spring overload by off-axial movement of the shaft 16. It should be appreciated that any off-axial movement in excess of that anticipated by the designer and sufficient to otherwise permanently deform the spring is prevented by the engagement of the shoulders 94 and 96 with the surface 32, thereby limiting the compression of the spring to the depth of the groove 92.

Figure 3:
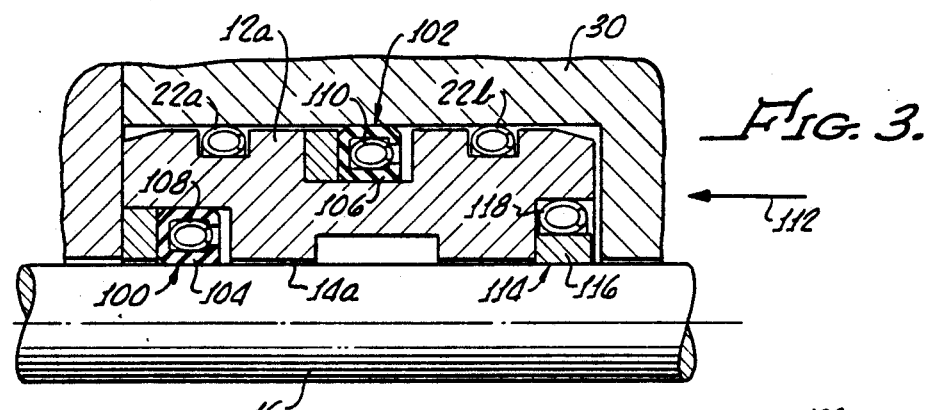
FIG. 3 is a cross-sectional view of an alternative embodiment of the present invention.
Figure 4:
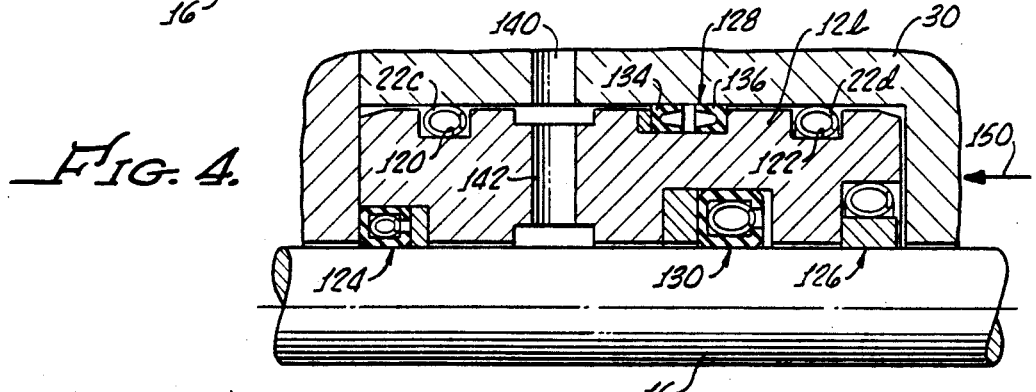
FIG. 4 is a cross-sectional view of yet another embodiment of the present invention.

Turning now to FIG. 3 and 4, there is shown alternative embodiments of the present invention with a bearing element 12a and 12b, respectively. The loading of the bearing is provided by a spring 22a in the manner hereinabove described. Additionally, a second spring member 22b may be provided with its operation being identical to spring 22 and 22a, as hereinabove described.

Because the bearing 12a takes up any off-axial sideloading of the shaft 16, a very close tolerance may be provided between the shaft 16 and the inside bearing surface 18a, such close clearances being as small as 7 microns. Seals 100, 102, may be provided, each including a U-shaped resilient member 104, 106 and a spring 108, 110, respectively, to provide a sealing engagement between the bearing 12a and the shaft 16 and between the bearing 12a and the housing 30.

If the direction of pressure is as shown by the arrow 112, an additional seal 114 may be provided which consists of a piston ring 116 and a biasing spring 118.

It should be appreciated that all of the seals herein described may be of any suitable type and sized in terms of loading requirement to provide effective sealing under the circumstances of pressure and environment in which the shaft and housing are to operate.

The bearing 12b shown in FIG. 4 is disposed within the housing and around the shaft 16 and includes two load springs 22c, 22d, disposed in grooves 120, 122, respectively, and operate as hereinabove described in connection with the load springs 22, 22a and 22b. A number of seals 124, 126, 128, 130 are provided for sealing between the bearing member 12b and the shaft 16 and housing 30. Seals 124 and 130 may be similar to that of seal 74 and seal 126 may be similar to that of 78 hereinabove described. The seal 128 may consist of two U-cup seal members 134, 136. A conduit 140 through the housing communicating with a conduit 142 in the bearing member 12b provides means for introducing a lubricant to the seal 128 between the housing 30 and the bearing member 12b and between the seals 124, 126 and 130 between the bearing member 12 and the shaft 16.

In instances where the pressure is from a direction shown by the arrow 150, the conduits 141, 142 may also be utilized to measure or sample leakage past the seals 126, 128 and 130. This is important where the bearing member 12b is utilized in a pump, or the like, for toxic materials when it may be desirable to monitor the effectiveness of the seal 126, 128 and 130 by monitoring the amount of liquids or gases escaping therepast.

Although there has been described herein above a specific cartridge bearing assembly in accordance with the present invention, for the purpose of illustrating the manner in which the invention may be used to advantage, it will be appreciated that the invention is not limited thereto. Accordingly, any and all modifications, variations, or equivalent arrangements which may occur to those skilled in the art, should be considered to be within the scope of the invention as defined in the appended claims.

What is claimed is:

1. A cartridge bearing assembly for reciprocating shafts comprising:

a non-resilient tubular bearing element having means defining an inside dynamic surface for engaging a reciprocating shaft;

spring means for engaging an outside static surface of the tubular bearing element for causing the tubular bearing element and shaft to float within a surrounding housing, said tubular bearing element remaining stationary with regard to shaft reciprocal movement but moving with the shaft in any off-axial movement;

first seal means for proving a seal between the tubular bearing element inside dynamic surface and said shaft, and second seal means for providing a seal between the tubular bearing element outside static surface and the surrounding housing.

2. The cartridge bearing assembly according to claim 1 wherein the spring means comprises an annular radially resilient canted coil spring having a generally flat radial force-deflection characteristic in the deflection range defined by the difference in radius of the tubular bearing element outside static surface and a housing inside surface.

3. The cartridge bearing assembly according to claim 2 further comprising conduit means passing through said tubular bearing element along a radius thereof for introducing a lubricant between the shaft and tubular bearing element inside dynamic surface and between the housing inside surface and tubular bearing element outside static surface.

4. The cartridge bearing assembly according to claim 3 further comprising means for preventing spring overload by off axial movement of said shaft.

5. The cartridge bearing assembly according to claim 4 wherein said means for preventing spring overload comprises means defining a groove in the tubular bearing element outside dynamic surface having adjacent portions for limiting the compression of the spring to the depth of the groove.

6. A cartridge bearing assembly for reciprocating shafts comprising:
a non-resilient tubular bearing element having inside surface means for bearing against a movable shaft inserted therethrough:
spring means for centering the tubular bearing element within a housing and for absorbing shaft side loading, said spring being disposed between said tubular bearing element and an inside surface of said housing;
tubular bearing element outside surface means for preventing spring overload;
first seal means for providing a seal between the tubular bearing element inside surface means and said shaft;
second seal means for providing a seal between the tubular bearing element outside surface means and the housing inside surface.

7. The cartridge bearing assembly according to claim 6 wherein the spring means comprises an annular radially resilient canted coil spring having a generally flat radial force-deflection characteristic in the deflection range defined by the difference in radius of the tubular bearing element outside surface and the housing inside surface.

8. The cartridge bearing assembly according to claim 7 further comprising conduit means passing through said tubular bearing element along a radius thereof for introducing a lubricant between the shaft and tubular being element inside surface and between the housing inside surface and tubular bearing element outside surface.

9. The cartridge bearing assembly according to claim 8 wherein the means for preventing spring overload comprises means defining a groove in the tubular bearing element outside surface having adjacent portion for limiting the compressing of the spring to the depth of the groove.

10. A cartridge bearing assembly for reciprocating shafts comprising:
a non-resilient tubular bearing element having means defining an inside dynamic surface for engaging a rotatable and/or reciprocal shaft;
spring means for absorbing shaft loading said shaft loading being transmitted through said tubular bearing element, said spring means being disposed between an outside static surface of the tubular bearing element and a surrounding housing.
first seal means for providing a seal between the tubular bearing element inside dynamic surface and said shaft; and
second seal means for providing a seal between the tubular bearing element outside static surface and an inside surface of housing.

11. The cartridge bearing assembly according to claim 10 wherein the spring means comprises an annular radially resilient canted coil spring having a generally flat radial force-deflection characteristic in the deflection range defined by the difference in radius of the tubular bearing element outside static surface and a housing inside surface.

12. The cartridge bearing assembly according to claim 11 further comprising conduit means passing through said tubular bearing element along a radius thereof for introducing a lubricant between the shaft and tubular bearing element inside dynamic surface and between the housing inside surface and tubular bearing element outside static surface.

13. The cartridge bearing assembly according to claim 12 further comprising means for preventing spring overload by off axial movement of said shaft.

14. The cartridge bearing assembly according to claim 13 wherein said means for preventing spring overload comprises means defining a groove in the tubular bearing element outside dynamic surface having adjacent portions for limiting the compressing of the spring to the depth of the groove.

* * * * *